US006256183B1

(12) United States Patent
Mosesian

(10) Patent No.: US 6,256,183 B1
(45) Date of Patent: Jul. 3, 2001

(54) TIME DELAY FUSE WITH MECHANICAL OVERLOAD DEVICE AND INDICATOR ACTUATOR

(75) Inventor: Jerry Mosesian, Newburyport, MA (US)

(73) Assignee: Ferraz Shawmut Inc., Newburyport, MA (US)

( * ) Notice: Subject to any disclaimer, the term of this patent is extended or adjusted under 35 U.S.C. 154(b) by 0 days.

(21) Appl. No.: 09/392,926

(22) Filed: Sep. 9, 1999

(51) Int. Cl.[7] .................... H02H 5/00

(52) U.S. Cl. .................... 361/104; 361/93.1; 361/103; 361/115

(58) Field of Search .................... 361/103, 104, 361/106, 93.1, 58, 115

(56) References Cited

U.S. PATENT DOCUMENTS

| | | | |
|---|---|---|---|
| 2,386,094 | 10/1945 | Duerkob | 200/123 |
| 2,435,472 | 2/1948 | Schuck | 200/120 |
| 2,613,297 | 10/1952 | Laing | 200/123 |
| 3,304,390 | 2/1967 | Lindell | 200/120 |
| 3,863,188 | 1/1975 | Knapp, Jr. | 337/164 |
| 4,058,784 | 11/1977 | Gaia | 337/164 |
| 4,593,262 | 6/1986 | Krueger | 337/163 |
| 4,888,573 | 12/1989 | Dunn | 337/164 |
| 5,077,534 | 12/1991 | Douglass | 337/164 |
| 5,294,905 | 3/1994 | Pimpis | 337/158 |
| 5,296,832 | 3/1994 | Perrault et al. | 337/158 |
| 5,318,462 | 6/1994 | Oakley | 439/716 |
| 5,319,344 | 6/1994 | Mosesian et al. | 337/244 |
| 5,343,185 | 8/1994 | Mosesian et al. | 337/163 |
| 5,357,234 | 10/1994 | Pimpis et al. | 337/246 |
| 5,361,058 | 11/1994 | Mosesian et al. | 337/158 |
| 5,406,244 | 4/1995 | Thwaites et al. | 337/163 |
| 5,426,411 | 6/1995 | Pimpis et al. | 337/186 |

*Primary Examiner*—Stephen W. Jackson
(74) *Attorney, Agent, or Firm*—Mark Kusner

(57) ABSTRACT

A fuse comprising a tubular fuse casing and first and second conductive ferrules located on the exterior of the casing at opposite ends thereof. The second ferrule has an opening therethrough. A first short circuit fusible element is attached to the first ferrule, and a heater is attached to the second ferrule. A time delay over-current trigger mechanism electrically connects the first fusible element and the heater to each other in series in an electrical path between the conductive ferrules. The mechanism is connected to receive heat from the heater and to mechanically interrupt the electrical path when the heater heats up under low over-current conditions. An indicator mechanism is provided for indicating when the electrical path between the conductive ferrules is interrupted. The indicator mechanism is comprised of an indicator movable from a first position wherein the indicator is substantially within the casing to a second position wherein a substantial portion of the indicator is outside the casing. An indicator-biasing element biases the indicator toward the second position. A second short circuit fusible element maintains the indicator in the first position. The second fusible element is electrically connected between the first and second ferrules in parallel within the first fusible element. The second fusible element has a current carrying capacity below said low over-current conditions.

32 Claims, 9 Drawing Sheets

TIME DELAY FUSE WITH MECHANICAL OVERLOAD DEVICE AND INDICATOR ACTUATOR

FIELD OF THE INVENTION

The present invention relates generally to electric fuses, and more particularly, to a time delay fuse.

BACKGROUND OF THE INVENTION

A time delay fuse is a type of fuse that is designed to allow temporary and harmless currents to pass therethrough without triggering (i.e. opening) the fuse. The fuse is nevertheless operable to open if subjected to sustained overloads or excessive short circuit conditions. Time delay fuses are typically used in circuits subject to temporary transients such as motor starting currents.

The present invention relates to an improved time delay fuse having indicator/actuator means for indicating a triggered (open) fuse.

SUMMARY OF THE INVENTION

In accordance with the present invention, there is provided an electric fuse comprised of a tubular casing formed of an electric insulating material. A first conductive ferrule is attached to a first end of the casing. A second conductive ferrule is attached to a second end of the casing, the second conductive ferrule having an opening therethrough. A first fusible element within the casing is electrically connected to the first conductive ferrule. A trigger mechanism is electrically connected in series to the fusible element and the second conductive ferrule. The trigger mechanism is comprised of a first conductive sleeve electrically connected to the second conductive ferrule. A conductive plunger is within the first conductive sleeve in electrical contact therewith. The plunger is biased away from the fusible element. A second conductive sleeve is electrically connected to the second ferrule. A conductive striker is disposed within the second sleeve in electrical contact therewith, the striker being biased along an axis through the opening in the second ferrule. Thermal solder maintains the plunger in a first position in electrical contact with the fusible element. A second fusible element is electrically connected in series between the first ferrule and the striker. The second fusible element is dimensioned to maintain the striker in a retracted position substantially within the casing. The second fusible element has a current carrying capacity less than the first fusible element.

In accordance with another aspect of the present invention, there is provided an electric fuse comprised of a tubular casing formed of an electric insulating material. A first conductive ferrule is attached to a first end of the casing. A second conductive ferrule is attached to a second end of the casing, the second conductive ferrule having an opening therethrough. A first conductive path is defined between the first ferrule and the second ferrule. The first conductive path is comprised of a first fusible element having a first current carrying capacity, a first stationary contact element and a movable contact element. A thermal element maintains the movable contact element in a first position in electrical contact with the first fusible element and the stationary contact element. A first biasing element biases the movable element to a second position destroying the first conductive path. A second conductive path is defined between the first ferrule and the second ferrule. The second conductive path is comprised of a second stationary contact element and an indicator movable along a path through the opening in the second ferrule from a first position wherein the indicator is substantially within the casing to a second position wherein a substantial portion of the indicator is outside the casing. A second biasing element biases the indicator from the first position to the second position. A second fusible element has a second current carrying capacity that is less than the first current carrying capacity. The second fusible element maintaining the indicator in the first position.

In accordance with another aspect of the present invention, there is provided a fuse comprising a tubular fuse casing and first and second conductive ferrules located on the exterior of the casing at opposite ends thereof. The second ferrule has an opening therethrough. A first short circuit fusible element is attached to the first ferrule, and a heater is attached to the second ferrule. A time delay over-current trigger mechanism electrically connects the first fusible element and the heater to each other in series in an electrical path between the conductive ferrules. The mechanism is connected to receive heat from the heater and to mechanically interrupt the electrical path when the heater heats up under low over-current conditions. An indicator mechanism is provided for indicating when the electrical path between the conductive ferrules is interrupted. The indicator mechanism is comprised of an indicator movable from a first position wherein the indicator is substantially within the casing to a second position wherein a substantial portion of the indicator is outside the casing. An indicator-biasing element biases the indicator toward the second position. A second short circuit fusible element maintains the indicator in the first position. The second fusible element is electrically connected between the first and second ferrules in parallel within the first fusible element. The second fusible element has a current carrying capacity below said low over-current conditions.

It is an object of the present invention to provide a time delay fuse having a mechanical trigger assembly for indicating when the fuse has blown.

Another object of the present invention is to provide a time delay fuse as described above that is operable to actuate an external device such as an electrical switch.

Another object of the present invention is to provide a time delay fuse as described above having a fusible element that is not influenced by a biasing device.

Another object of the present invention is to provide a time delay fuse as described above that contains an arc-quenching material that does not interfere with the mechanical trigger assembly.

These and other objects and advantages will become apparent from the following description of a preferred embodiment of the present invention, taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
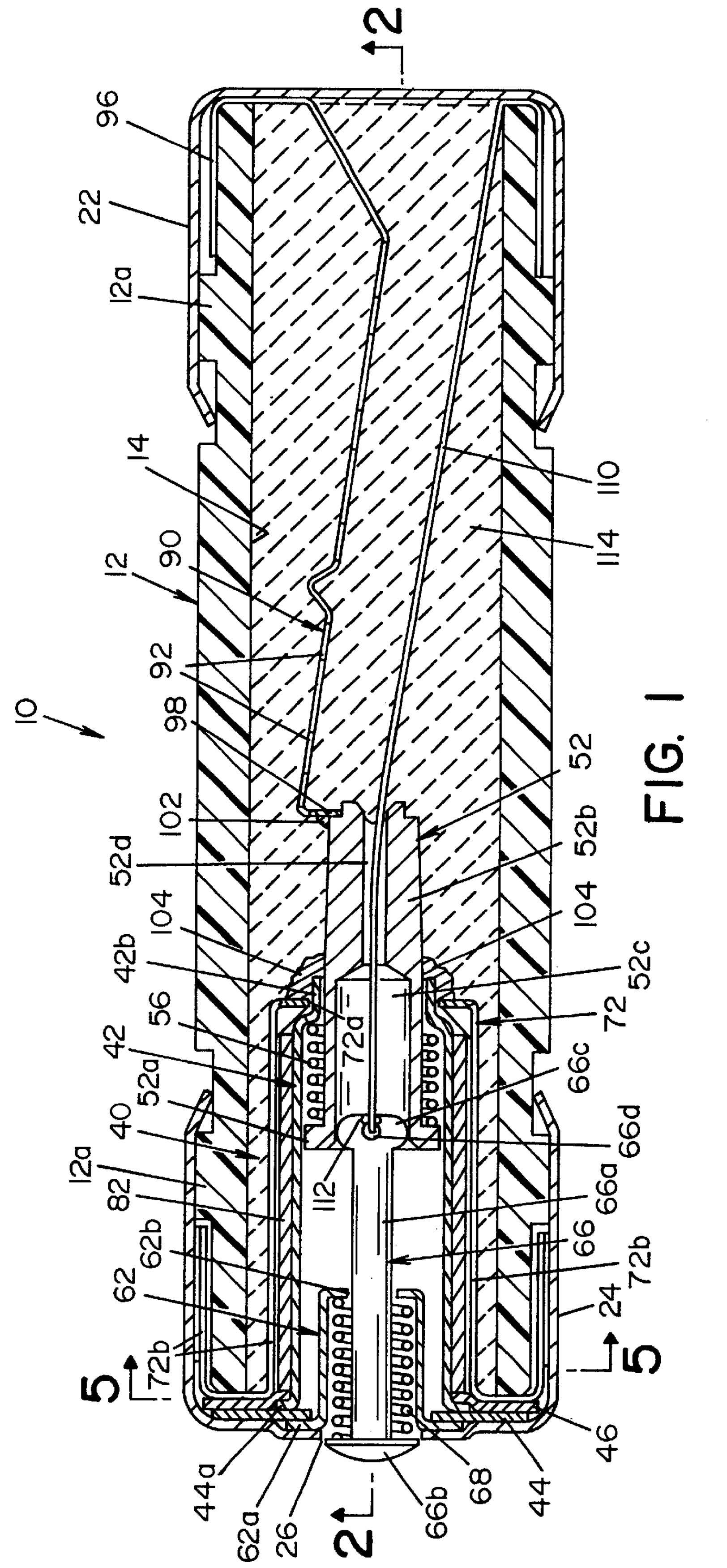
FIG. 1 is a cross-sectional view of a time delay fuse illustrating a preferred embodiment of the present invention.

Referring now to the drawings wherein the showings are for the purpose of illustrating preferred embodiments of the invention only, and not for the purpose of limiting same, FIG. 1 shows a fuse 10 illustrating a preferred embodiment of the preferred invention. Fuse 10 is generally comprised of a tubular, insulative fuse casing 12 having an inner bore or cavity 14 that extends axially through fuse casing 12. In the embodiment shown, fuse casing 12 is a cylindrical shape and defines a cylindrical cavity 14. The outer surface of fuse casing 12 is formed to define annular collars 12*a* at the distal ends of fuse casing 12. A first end ferrule 22 is provided for attachment onto one end of fuse casing 12 and a second end ferrule 24 is provided for attachment onto the other end of fuse casing 12. Second end ferrule 24 includes an opening 26 therethrough that communicates with cavity 14. Ferrules 22, 24 are formed from an electrically conductive metal such as bronze, copper or alloys thereof.

Contained within cavity 14 of fuse casing 12 is a trigger/actuator assembly 40, a first fusible element 90 and a second fusible element 110. Trigger/actuator assembly 40 is generally comprised of a tubular, first electrically conductive sleeve 42 having a flared, annular collar 42*a* at one end thereof and a necked-down portion 42*b* at the other end thereof. As best seen in FIG. 1, collar portion 42*a* is adapted to be captured between a first washer 44 and a second washer 46. Washers 44 and 46 are formed of an electrically conductive material and are dimensioned to have an outer peripheral diameter approximately equal to the outer diameter of fuse casing 12. Washer 44 and 46 are dimensioned to be in conductive contact with second end ferrule 24, as best seen in FIG. 1. A plunger 52 formed of an electrically conductive material is disposed within sleeve 42. Plunger 52 is generally cylindrical in shape and includes an enlarged flange portion 52*a* and an elongated shank portion 52*b*. A large central bore 52*c* extends partially through plunger 52. Bore 52*c* communicates with and is in axial alignment with a smaller bore 52*d*. Flange portion 52*a* is dimensioned to have an outer surface profile that generally conforms to the inner surface profile of conductive sleeve 42. Shank portion 52*b* extends through the opening defined by neck-down portion 42*b* of sleeve 42. Flange 52*a* is dimensioned to be in electrical contact with the inner surface of sleeve 42 and is free to slide therein. A first biasing element 56 in the form of a compression spring is disposed around shank 52*b* of plunger 52 and between flange portion 52*a* and neck-down portion 42*b* of sleeve 42. Spring 56 is operable to bias plunger 52 toward opening 26 in second ferrule 24. A second electrically conductive sleeve 62 is disposed within first conductive sleeve 42. Sleeve 62, that is smaller in size than sleeve 42, includes a flared annular collar 62*a* at one end. Collar 62*a* is designed to be captured between first washer 44 and end ferrule 24, as shown in the drawings. The other end of sleeve 62 is closed, but formed to have an opening 62*b*. An indicator/striker 66 is disposed within sleeve 62. Indicator/striker 66 has an elongated shank 66*a*, a cap 66*b* and a flattened end 66*c*. An opening 66*d* is formed through flattened end 66*c*. Shank 66*a* is dimensioned to extend through opening 62*b* in sleeve 62. Flattened end 66*c* is dimensioned to fit within large bore 52*c* of plunger 52. A second biasing element 68 is disposed between cap 66*b* of indicator/striker 66 and the closed end of sleeve 62. Biasing element 68 is operable to bias indicator/striker 66 along an axis through the opening in second ferrule 24.

Figure 6:
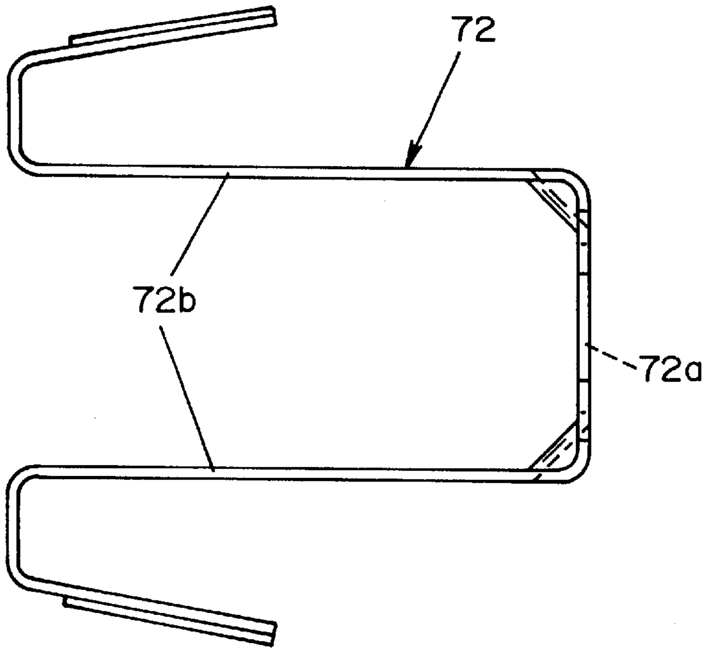
FIG. 6 is an enlarged side view of the heating element used in the time delay fuse shown in FIG. 1.
Figure 7:
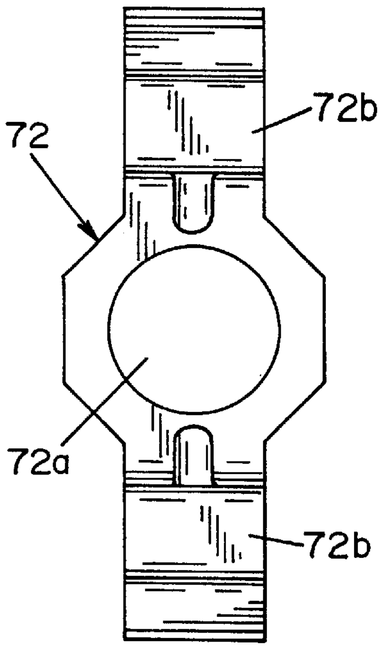
FIG. 7 is an end view of the heating element shown in FIG. 6.

Trigger/actuator assembly 40 further includes a heating element 72, best seen in FIGS. 6 and 7. Heating element 72 is formed from a generally flat strip of conductive material, and has an opening 72*a*, best seen in FIG. 7, that is adapted to receive shank portion 52*b* of plunger 52. Heating element 72 has two leg portions 72*b* that are adapted to extend along side of sleeve 42. In the embodiment shown, an insulator sleeve 82, as seen in FIG. 1, in the form of a paper tube is disposed between heating element 72 and conductive sleeve 42. As best seen in FIG. 1, trigger assembly 40 is fastened between second end ferrule 24 and the end of tube casing 12 wherein sleeve 42 and heating element 72 are electrically connected to end ferrule 24.

Figure 2:
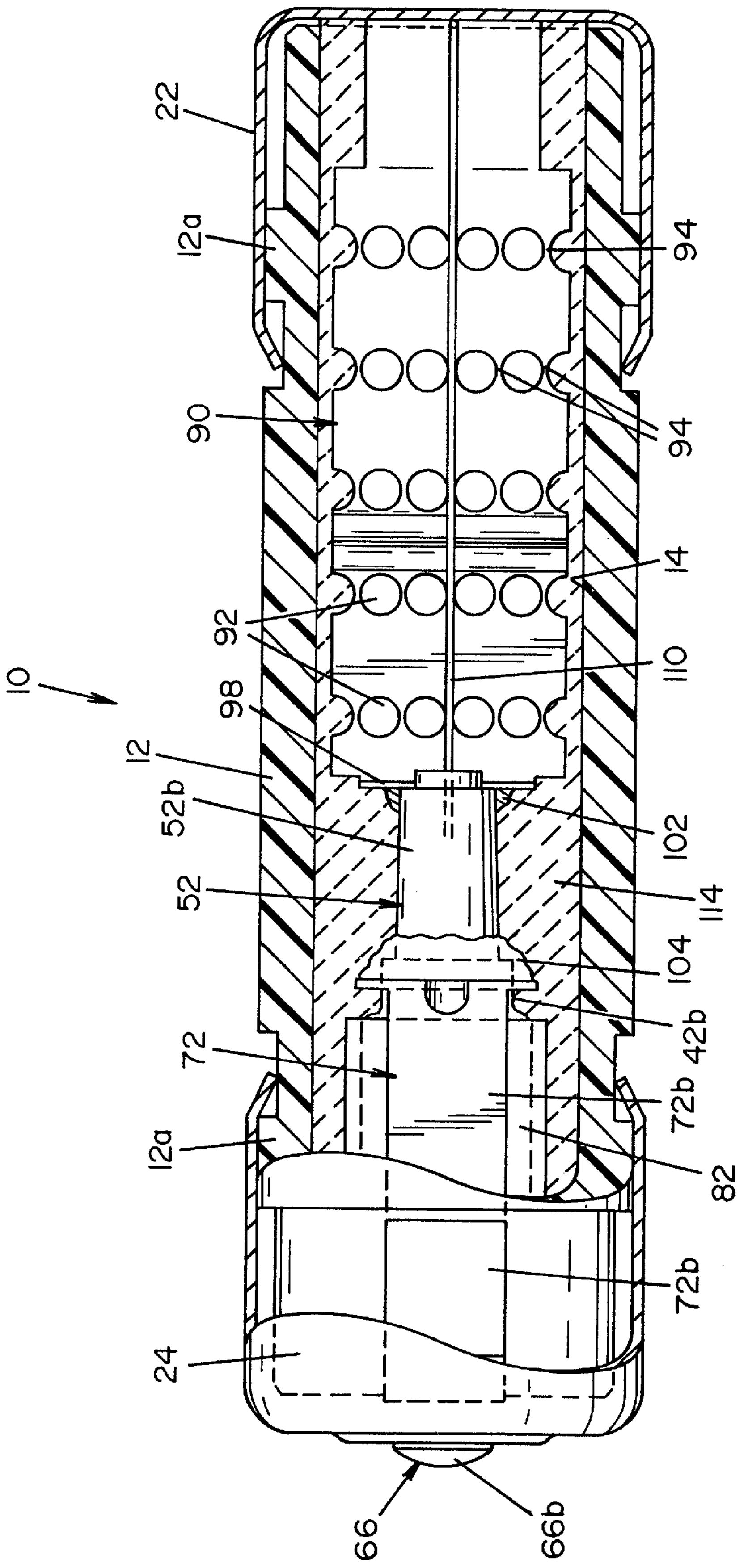
FIG. 2 is a partial sectional view taken along lines 2—2 of FIG. 1.
Figure 3:
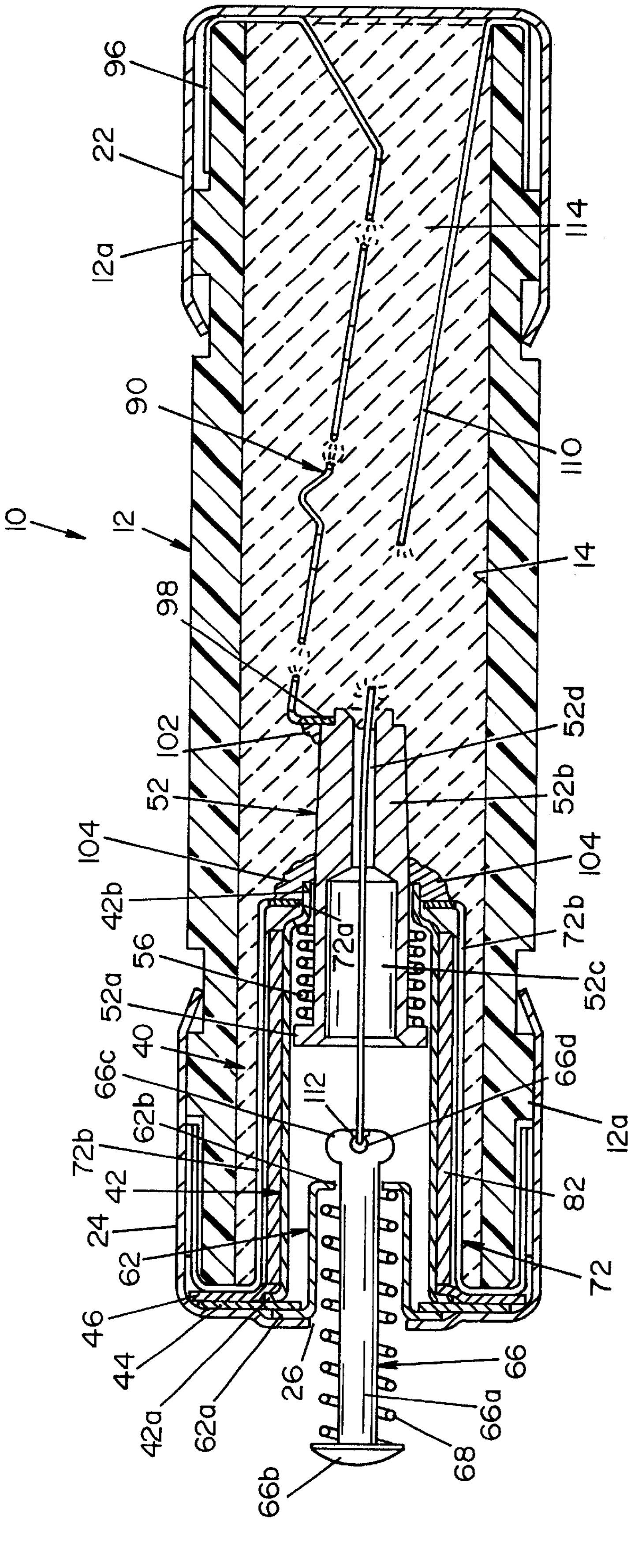
FIG. 3 is a cross-sectional view of the time delay fuse shown in FIG. 1 after a short circuit fault has "opened" the fuse.

Referring now to FIG. 2, first fusible element 90 is best seen. First fusible element 90 is essentially a flat strip of conductive material. First fusible element 90 is preferably formed of silver, copper or copper alloys. The size of fusible element 90 determines the ampere rating of fuse 10. The present invention finds particular application for fuses rated from 0 to 60 Amps, but could also be used in fuses rated up to 600 Amps. In the embodiment shown, fusible element 90 includes a plurality of aligned apertures 92 that define a plurality of "notched sections" 94 that reduce the cross-section of first fusible element 90 and establish the current carrying capacity thereof. As best seen in FIGS. 1 and 3, first fusible element 90 includes a first end 96 that is secured by first end ferrule 22 against the end of fuse casing 12. First fusible element 90 includes a second end in the form of a tab 98 that is bent and soldered to the end of shank portion 52*b* of plunger 52 by a first temperature sensitive material 102. First fusible element 90 is dimensioned such that plunger 52 is in a first retracted position against a compressed first biasing element 56 when first fusible element 90 is attached to plunger 52 by first temperature sensitive material 102.

Plunger 52 is also maintained in the first retracted position by a second temperature sensitive material 104 that secures shank portion 52*b* to conductive sleeve 42. As best seen in FIG. 1, heating element 72 is in thermal and electrical contact with second temperature sensitive material 104.

First and second temperature sensitive material 102, 104 are formed of a solder material, or other suitable substance, that is solid at the normal operating temperatures of fuse 10, and is capable of providing a solid mechanical and a good, low resistance electrical connection between the components it contacts. In the embodiment shown, temperature sensitive material 102, 104 are preferably formed of a low melting temperature, metal alloy having a melting temperature in the range of 100° C. to about 150° C., and more preferably about 145° C.

Second fusible element 110 is comprised of a length of metallic wire. One end of second fusible element 110 is fixedly connected to the inner surface of indicator/striker 66. Second fusible element 110 may be attached to indicator/striker 66 by a number of different mechanical means, but in the embodiment shown is attached by a third temperature sensitive material 112. Second fusible element 110 extends axially through spring 68 and bores 52*c*, 52*d* of plunger 52 into cavity 14. A second end of second fusible element 110 is captured between first end ferrule 22 and the end of fuse casing 12. Second fusible element 110 is dimensioned such that when connected between indicator/striker 66 and first end ferrule 22, indicator/striker 66 is in a first retracted position wherein indicator/striker 66 is substantially within casing 12, as shown in FIG. 1. In this first retractive position, second biasing element 68 is compressed and exerts a force on indicator/striker 66, biasing indicator/striker 66 away from plunger 52 through opening 26 in second end ferrule 24. Second fusible element 110 provides a low current carrying connection between end ferrules 22, 24 and retains indicator/striker 66 in a retracted, first position. The current carrying capacity of second fusible element 110 is significantly less than that of first fusible element 90. The current carrying capacity of second fusible element 110 is about 100% of the rating of fuse 10.

The embodiment heretofore described basically defines a first conductive path between end ferrules 22, 24. The first conductive path is comprised of first fusible element 90, sleeve 42, plunger 52, alloy materials 102, 104 and biasing element 56. In this respect, sleeve 42 is basically a stationary contact element, while plunger 52 represents a movable contact element that is biased away from first fusible element 90 by spring 56.

Fuse 10 also includes a second electrically conductive path defined between end ferrules 22, 24. The second conductive path is comprised of sleeve 62, indicator/striker 66 and second fusible element 110. Sleeve 62 is essentially a stationary contact, while indicator/striker 66 is a movable contact held in an initial first position by fusible element 110.

An arc-quenching material 114 is disposed within cavity 14 and surrounds trigger/actuated assembly 40. In a preferred embodiment, arc-quenching material 114 is comprised of silica quartz sand. As illustrated in the drawings, the configuration of trigger/actuator assembly 40 is operable to prevent arc-quenching material 114 from penetrating into conductive sleeve 42.

MANUFACTURE

In manufacture, a sub-assembly including second end ferrule 24, washers 44 and 46, trigger/actuator assembly 40, first fusible element 90 and second fusible element 110 is prepared. Indicator/striker 66 of trigger/actuator assembly 40 is held in retracted position as the sub-assembly is then placed within fuse casing 12. With the sub-assembly within fuse casing 12, the ends of first fusible element 90 and second fusible element 110 are bent over the ends of fuse casing 12. Arc-quenching material 114 is then introduced into cavity 14. First end ferrule 22 is then attached to fuse casing 12 locking first and second fusible elements 90, 110 in position, as shown in FIG. 1, and in electrical contact with end ferrule 22.

OPERATION

Fuse 10 is adapted to open if subjected to an excessive short circuit condition or if subjected to a moderate overload for a sustained period of time, and to provide an indication if fuse 10 is open as a result of either condition.

Referring now to the operation of fuse 10 under a short circuit condition, when current in excess of 10 times the nominal rated current of fuse 10 passes through fuse 10 longer than 1 to 2 milliseconds, first fusible element 90 ionizes and forms an interrupt arc. At higher currents element 90 ionizes even sooner. The interrupt arc is quenched within fuse casing 12 by arc-quenching material 114. Current flowing through fusible element 90 is thus terminated. Typically, first fusible element 90 deteriorates so quickly that first temperature sensitive material 102 and second temperature sensitive material 104 remain in a solid state and maintain plunger 52 in its first retractive position. With first fusible element 90 no longer carrying current, the current through fuse 10 is transferred to second fusible element 110. Since second fusible element 110 has significantly less current carrying capacity than first fusible element 90, second fusible element 110 quickly ionizes. The destruction of second fusible element 110 removes the restraint on indicator/striker 66, allowing it to move from its first contracted position. Under the influence of biasing spring 68, indicator/striker 66 moves outward through opening 26 in second end ferrule 24. The movement of indicator/striker 66 provides an indication of the open fuse condition, and may also be used as an actuating device to engage a switch or the like to control external devices. FIG. 3 depicts fuse 10 following a short circuit fault. As seen in FIG. 3, plunger 52 is maintained in its first retracted position by temperature sensitive material 104.

Figure 4:
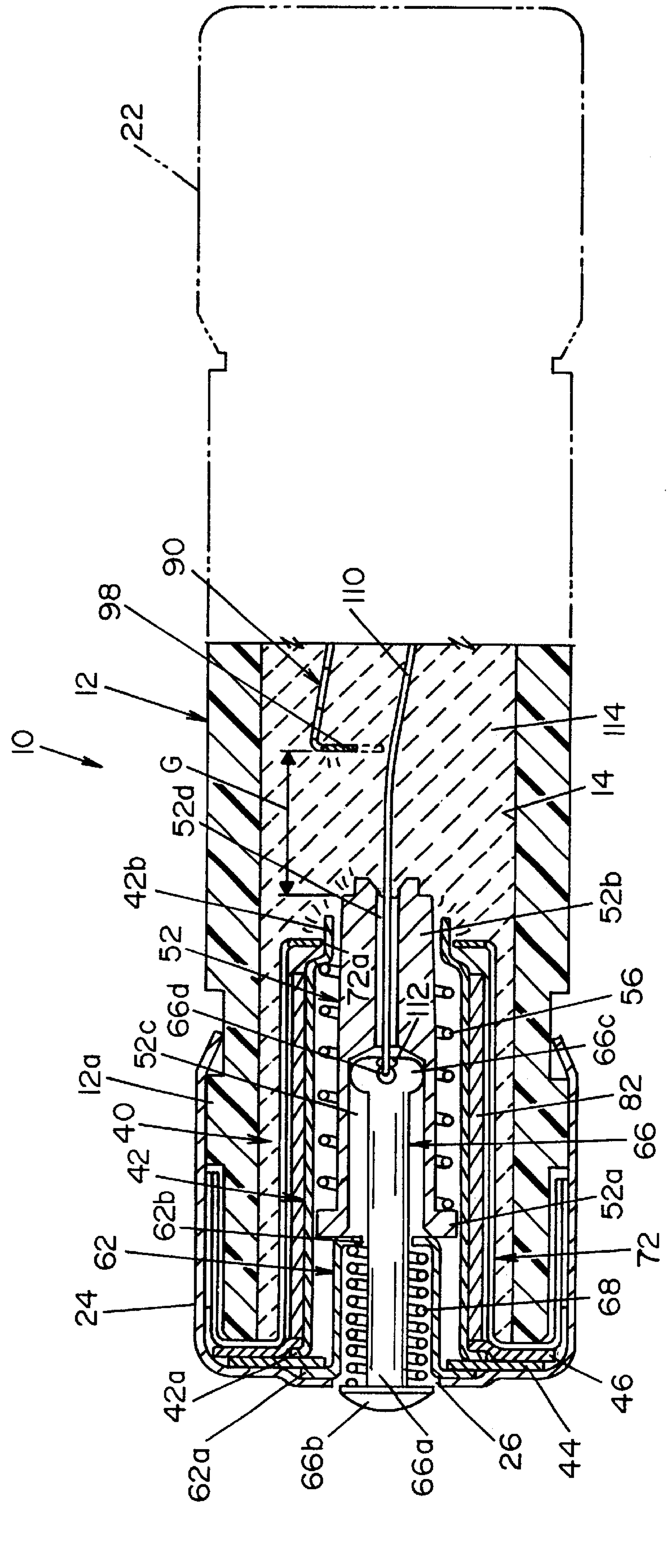
FIG. 4 is a partial, cross-sectional view of the time delay fuse shown in FIG. 1 during an over-voltage fault condition, showing a first stage in "opening" the fuse.
Figure 4A:
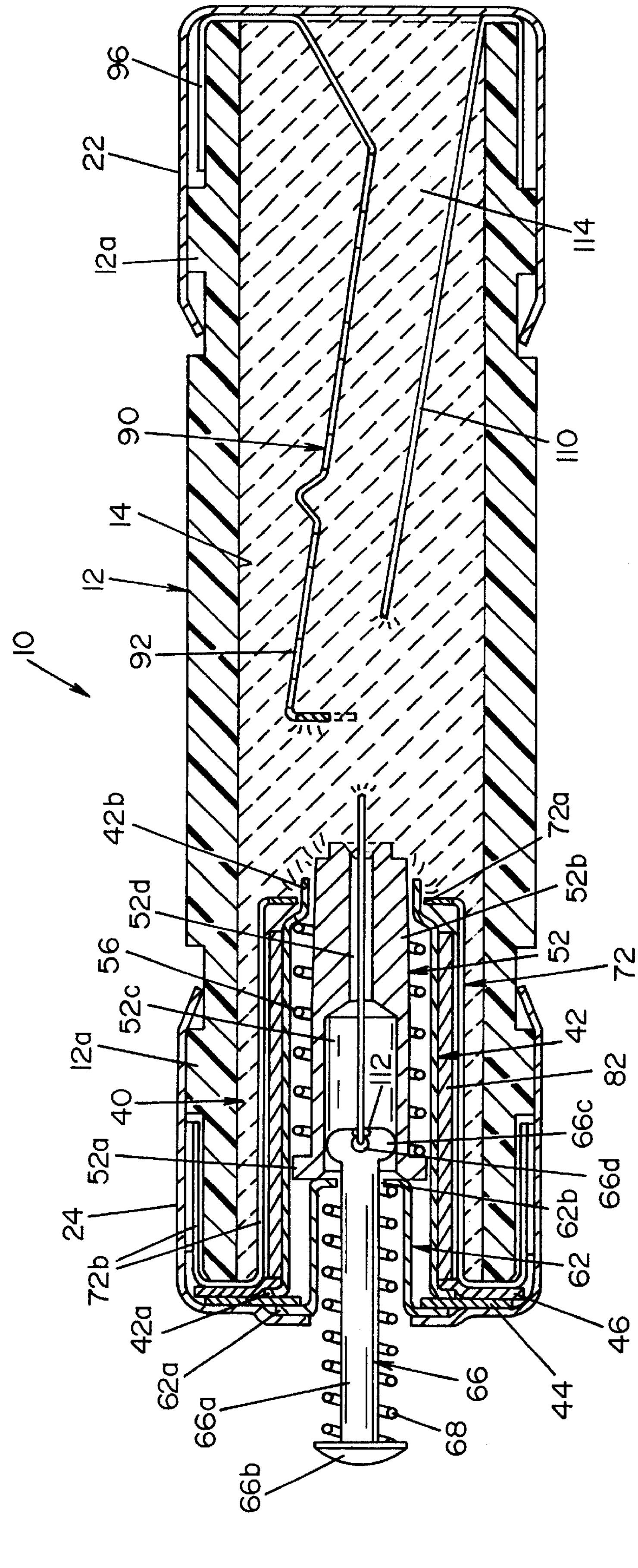
FIG. 4A is a cross-sectional view of the time delay fuse shown in FIG. 1 after an over-voltage fault condition has "opened" the fuse.
Figure 5:
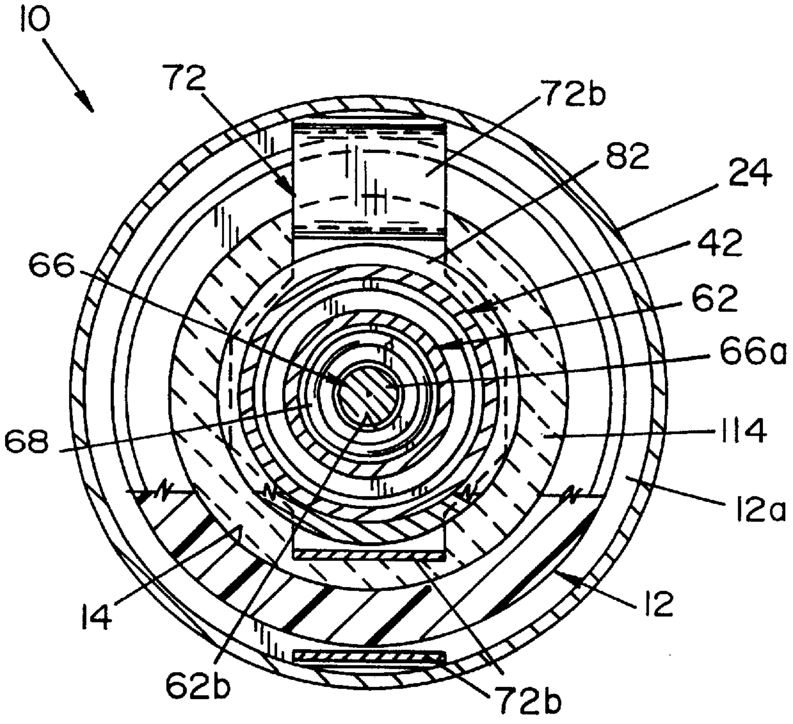
FIG. 5 is a cross-sectional view taken along lines 5—5 of FIG. 1.

Referring now to an over-voltage fault condition, at low overload currents, for example, two times the rated current, first fusible element 90 will not ionize. Rather, heating element 72 and portion of trigger/actuator assembly 40 will heat up. Such heat will be conducted to temperature sensitive materials 102, 104. When the temperature reaches the melting point of temperature sensitive materials 102, 104, first and second temperature sensitive materials 102 and 104 melt, thereby freeing plunger 52 from conductive sleeve 42. Plunger 52 is then free to move away from first fusible element 90 a distance equal to that defined by gap "G." FIG. 4 shows plunger 52 after it has moved away from first fusible element 90. At this point, plunger 52 is restrained from further movement by indicator/striker 66 that is still held in place by second fusible element 110. With first fusible element 90 no longer in contact with plunger 52, the current load transfers to second fusible element 110. Fusible element 110 cannot withstand the current and therefore ionizes, releasing both plunger 52 and indicator/striker 66 from their contracted positions and allowing indicator/striker 66 to move outwardly through opening 26 and second end ferrule 24. FIG. 4A shows fuse 10 in an open condition as a result of a prolonged, low overload current fault. As shown in FIG. 4A, both plunger 52 and indicator/striker 66 are released from their original retracted positions.

The present invention thus provides a time delay fuse having a trigger/actuator assembly that provides both an indication of a blown fuse condition and means for actuating a secondary device such as a switch upon the occurrence of a blown fuse condition.

Figure 8:
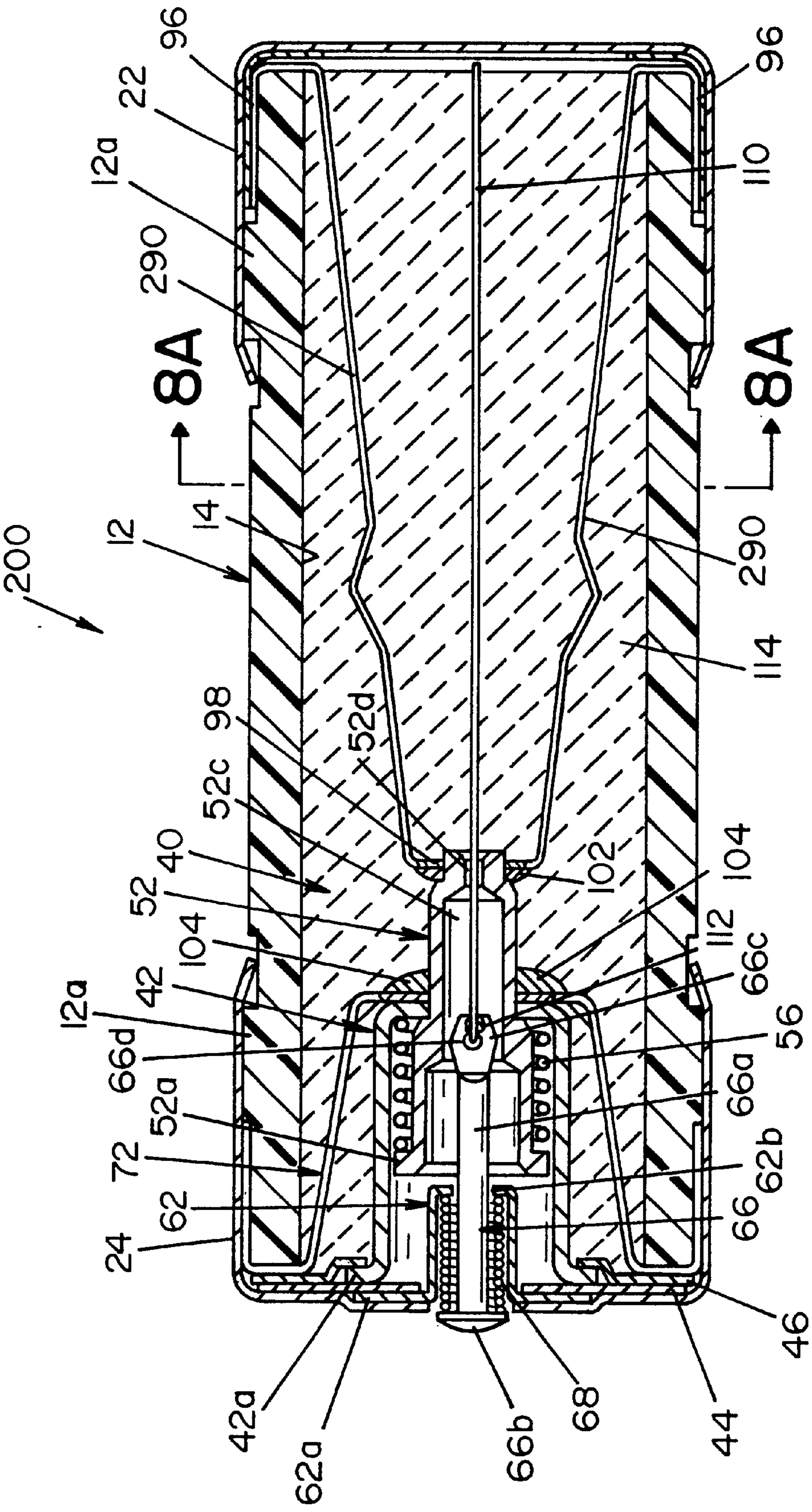
FIG. 8 is a cross-sectional view of a time delay fuse illustrating an alternate embodiment of the present invention for high current rating applications.
Figure 8A:
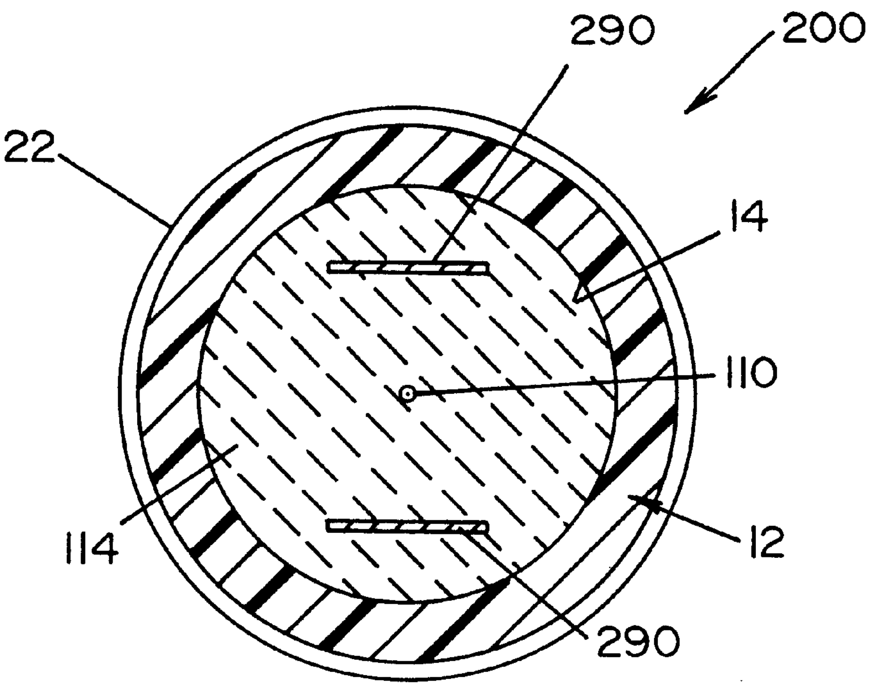
FIG. 8A is a cross-sectional view taken along lines 8A—8A of the FIG. 8.

Referring now to FIGS. 8 and 8A and FIGS. 9 and 9A, alternate embodiments of the present invention are shown. FIGS. 8 and 8A show a fuse 200 that is a modification of fuse 10, as shown in FIGS. 1–7. Fuse 200 is adapted for higher current ratings than fuse 10. Fuse 200 is comprised of the same basic components as fuse 10, the difference being that the size and shape of some of the components are different for higher current applications. In the drawings, similar components bear the same reference numbers. Fuse 200, like fuse 10, includes a trigger/actuator assembly 40. The main difference between fuse 10 and fuse 200, is that fuse 200 includes two main fusible elements 290, whereas fuse 10 includes only main fusible element (i.e., first fusible element 90). Each main fusible element 290 of fuse 200 is preferably comprised of a flat strip of conductive material, and has the same general construction as the first fusible element 90. The use of two main fusible elements 290 in fuse 200 doubles the current capacity fuse 200 would have as contrasted with the same fuse with only one main fusible element 290.

Fuse 200 thus shows how the current carrying capacity of a fuse may be increased without increasing its overall physical size. It will, of course, be appreciated that more than two main fusible elements 290 could be connected in parallel between end first and ferrule 22 and plunger 52 without deviating from the present invention.

Figure 9A:
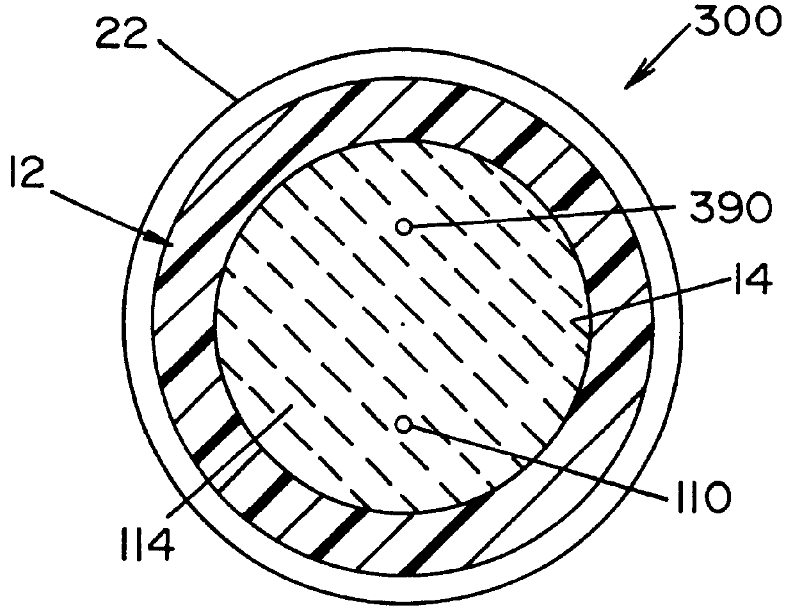
FIG. 9A is a cross-sectional view taken along lines 9A—9A of the FIG. 9.
Figure 9:
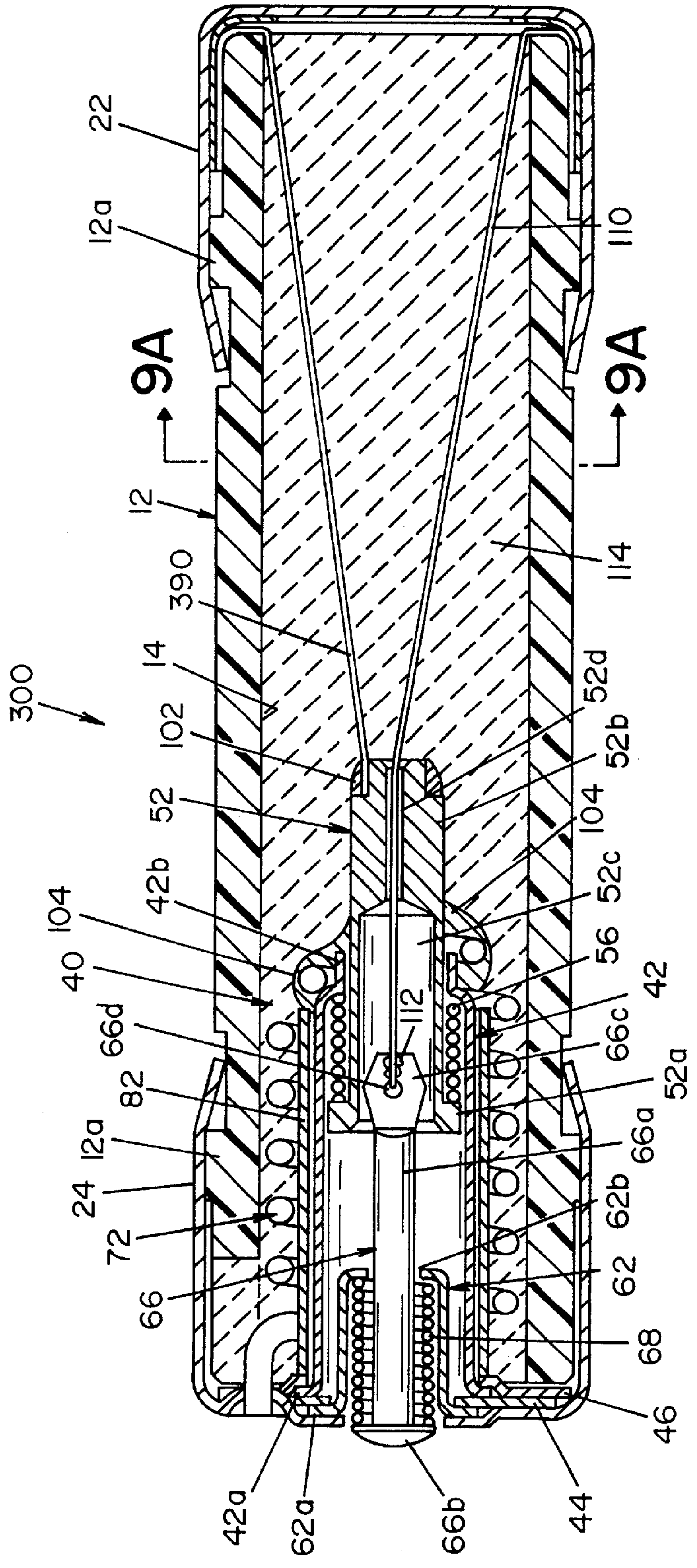
FIG. 9 is cross-sectional view of a time delay fuse illustrating an alternate embodiment of the present invention for low current rating applications.

Referring now to FIGS. 9 and 9A, a fuse 300 for lower current capacity applications is shown. Fuse 300 is like fuse 10 and fuse 200, and includes a similar trigger/actuator assembly 40 having similar components. The specific size and shape of the components of trigger/actuator assembly 40 is based upon the current carrying capacity of fuse 300. Components similar to those in fuses 10 and 200 have the same reference numbers. Unlike fuses 10 and 200 that have one or more main fusible elements that are formed of flat strips of conductive material, a wire element 390 is the main fusible element in fuse 300. Wire element 390 is connected in series with plunger 52 and first end ferrule 22. As will be appreciated, wire element 390 has a much lower current carrying capacity than either first fusible element 90 of fuse 10 or main fusible elements 290 of fuse 200. Fuse 300 thus illustrates a current limiting fuse for low current carrying applications.

Both fuse 200 and fuse 300 open if subjected to an excessive short circuit condition or if subjected to a moderate overload for a sustained period of time. Like fuse 10, both fuses 200 and 300 provide an indication if the fuse is open as a result of either condition, in a manner as previously described with respect to fuse 10.

The foregoing description is a specific embodiment of the present invention. It should be appreciated that this embodiment is described for the purpose of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. An electric fuse, comprised of:

a tubular casing formed of an electric insulating material;

a first conductive ferrule attached to a first end of said casing;

a second conductive ferrule attached to a second end of said casing, said second conductive ferrule having an opening therethrough;

a first fusible element within said casing electrically connected to said first conductive ferrule;

a trigger mechanism electrically connected in series to said first fusible element and said second conductive ferrule, said trigger mechanism comprised of:

a first conductive sleeve electrically connected to said second conductive ferrule, a conductive plunger within said first conductive sleeve in electrical contact therewith, said plunger being biased away from said fusible element, a second conductive sleeve electrically connected to said second ferrule, a conductive striker within said second sleeve in electrical contact therewith, said striker being biased along an axis through said opening in said second ferrule, thermal solder maintaining said plunger in a first position in electrical contact with said fusible element; and a second fusible element electrically connected in series between said first ferrule and said striker, said second fusible element dimensioned to maintain said striker in a retracted position substantially within said casing, said second fusible element having a current carrying capacity less than said first fusible element.

2. A fuse as defined in claim 1, further comprising a heating element electrically connected in series between said second ferrule and said thermal solder.

3. A fuse as defined in claim 1, wherein said first fusible element is comprised of a flat strip of metal having a plurality of rows of apertures formed therethrough, said apertures defining a plurality of notch sections.

4. A fuse as defined in claim 1, wherein said second fusible element is a wire.

5. A fuse as defined in claim 4, wherein said wire is electrically connected to said conductive striker and said first ferrule.

6. A fuse as defined in claim 5, wherein said wire extends through said plunger.

7. A fuse as defined in claim 6, further comprising a first biasing element for biasing said plunger and a second biasing element for biasing said striker.

8. A fuse as defined in claim 7, wherein said second biasing element is a spring and said spring is disposed between said plunger and said striker.

9. A fuse as defined in claim 8, wherein said first biasing element is a spring.

10. A fuse as defined in claim 9, wherein said plunger is in axial alignment with said striker.

11. A fuse as defined in claim 6, wherein said tubular casing is filled with an arc-quenching material.

12. A fuse as defined in claim 11, wherein said arc-quenching material is quartz sand.

13. A fuse as defined in claim 1, wherein said striker is movable from a first position wherein said striker is substantially within said casing to a second position wherein a substantial portion of said striker is outside said housing.

14. A fuse as defined in claim 13, wherein said second conductive sleeve is disposed within said first conductive sleeve, and said striker is in axial alignment with said plunger.

15. A fuse as defined in claim 1, wherein said first fusible element is a wire.

16. A fuse as defined in claim 15, wherein said second fusible element is a wire.

17. A fuse as defined in claim 3, further comprising a third fusible element electrically connected in series between said first conductive ferrule and said trigger mechanism, said third fusible element being in parallel with said first fusible element.

18. A fuse as defined in claim 17, wherein said third fusible element is substantial identical to said first fusible element.

19. An electric fuse, comprised of:

a tubular casing formed of an electric insulating material;

a first conductive ferrule attached to a first end of said casing;

a second conductive ferrule attached to a second end of said casing, said second conductive ferrule having an opening therethrough;

a first conductive path defined between said first ferrule and said second ferrule, said first conductive path comprised of:

a first fusible element having a first current carrying capacity, a first stationary contact element, a movable contact element, a thermal element maintaining said movable contact element in a first position in electrical contact with said first fusible element and said stationary contact element, and a first biasing element biasing said movable element to a second position destroying said first conductive path; and a second conductive path defined between said first ferrule and said second ferrule, said second conductive path comprised of:

a second stationary contact element, an indicator movable along a path through said opening in said second ferrule from a first position wherein said indicator is substantially within said casing to a second position wherein a substantial portion of said indicator is outside said casing, a second biasing element biasing said indicator from said first position to said second position, and a second fusible element having a second current carrying capacity that is less than said first current carrying capacity, said second fusible element maintaining said indicator in said first position.

20. An electric fuse as defined in claim 19, wherein:

said first stationary contact element is a first cylindrical sleeve in contact with said second ferrule, said movable contact element is a plunger within said first sleeve, and said first biasing element is a spring disposed within said first sleeve between said first sleeve and said plunger, said first biasing element biasing said plunger in a direction away from said first fusible element.

21. An electric fuse as defined in claim 20, wherein:

said second stationary contact element is a second cylindrical sleeve in contact with said second ferrule, said indicator is a pin movable through said second cylindrical sleeve, and said second biasing element is a spring disposed within said second sleeve between said second sleeve and said pin.

22. An electric fuse as defined in claim 21, wherein said thermal element is a low-melting temperature solder attached to said plunger and said first fusible element.

23. An electric fuse as defined in claim 21, further comprising a heating element connected in series between said second ferrule and a solder mass connecting said plunger to said first sleeve.

24. An electric fuse as defined in claim 21, wherein said second sleeve is disposed within said first sleeve and said indicator is in axial alignment with said plunger.

25. An electric fuse as defined in claim 24, wherein said plunger includes an axially aligned bore therethrough and said second fusible element extends through said bore.

26. A fuse, comprising:

a tubular fuse casing;

first and second conductive ferrules located on the exterior of said casing at opposite ends of said casing, said second ferrule having an opening therethrough;

a first short circuit fusible element attached to said first ferrule;

a heater attached to said second ferrule;

a time delay over-current trigger mechanism electrically connecting said first fusible element and said heater to each other in series in an electrical path between said conductive ferrules, said mechanism being connected to receive heat from said heater and to mechanically interrupt said electrical path when said heater heats up under low over-current conditions; and an indicator mechanism for indicating when said electrical path between said conductive ferrules is interrupted, said indicator mechanism comprising:

an indicator movable from a first position wherein said indicator is substantially within said casing to a second position wherein a substantial portion of said indicator is outside said casing, an indicator biasing element biasing said indicator toward said second position, and a second short circuit fusible element maintaining said indicator in said first position, said second fusible element being electrically connected between said first and second ferrules in parallel within said first fusible element, said second fusible element having a current carrying capacity below said low over-current conditions.

27. A fuse as defined in claim 26, wherein said trigger mechanism is comprised of:

a conductive sleeve;

a plunger movable within said sleeve;

a biasing element disposed within said sleeve for biasing said plunger away from said first fusible element; and solder mass securing said plunger in electrical contact with said first fusible element.

28. A fuse as defined in claim 27, wherein said first fusible element is connected to said plunger by a first solder mass, and said heater is connected to said plunger by a second solder mass.

29. A fuse as defined in claim 27, wherein said second fusible element extends through said plunger.

30. A fuse as defined in claim 27, wherein said indicator is in axial alignment with said plunger.

31. A fuse as defined in claim 27, wherein said first fusible element is a wire.

32. A fuse as defined in claim 27, further comprised of a pair of first short circuit fusible elements connected in series between said first ferrule and said trigger mechanism.

* * * * *